(12) United States Patent
Voigtlander et al.

(10) Patent No.: US 12,153,262 B2
(45) Date of Patent: Nov. 26, 2024

(54) MULTICORE FIBER CONNECTIVITY USING DIFFERENT MODE FIELD DIAMETERS

(71) Applicants: FBGS TECHNOLOGIES GMBH, Jena (DE); FBGS INTERNATIONAL NV, Geel (BE)

(72) Inventors: Christian Voigtlander, Jena (DE); Johan Vlekken, Diepenbeek (BE); Bram Van Hoe, Ghent (BE); Jan Van Roosbroeck, Hallaar (BE); Eric Lindner, Jena (DE)

(73) Assignees: FBGS TECHNOLOGIES GMBH, Jena (DE); FBGS INTERNATIONAL NV, Geel (BE)

( * ) Notice: Subject to any disclaimer, the term of this patent is extended or adjusted under 35 U.S.C. 154(b) by 0 days.

(21) Appl. No.: 18/347,082

(22) Filed: Jul. 5, 2023

(65) Prior Publication Data
US 2023/0341632 A1   Oct. 26, 2023

Related U.S. Application Data

(63) Continuation-in-part of application No. 17/252,952, filed as application No. PCT/EP2019/067102 on Jun. 26, 2019, now Pat. No. 11,733,463.

(30) Foreign Application Priority Data

Jul. 4, 2018 (EP) .................................. 18181742

(51) Int. Cl.
G02B 6/38 (2006.01)
G02B 6/02 (2006.01)

(52) U.S. Cl.
CPC ....... G02B 6/3834 (2013.01); G02B 6/02009 (2013.01); G02B 6/3885 (2013.01)

(58) Field of Classification Search
CPC .............. G02B 6/3604; G02B 6/02042; G02B 6/02076; G01D 5/3538
See application file for complete search history.

(56) References Cited

U.S. PATENT DOCUMENTS 5,438,873 A   8/1995   Wlodarczyk et al.
5,719,973 A   2/1998   Monroe et al.
(Continued)

FOREIGN PATENT DOCUMENTS

| EP | 2840423 A1 | 2/2015 |
|---|---|---|
| EP | 3364561 A1 | 8/2018 |
| WO | 2017090603 A1 | 6/2017 |

OTHER PUBLICATIONS

International Search Report and Written Opinion from PCT Application No. PCT/EP2019/067102, Aug. 28, 2019.
(Continued)

*Primary Examiner* — Tony Ko
(74) *Attorney, Agent, or Firm* — Workman Nydegger

(57) ABSTRACT

A fiber-optic system for use in optical sensing includes a multicore sensing fiber having at least two cores of which each of the at least two cores has a first core diameter, and a multicore lead-in fiber having at least two cores including a position corresponding with the position of the at least two cores of the multicore sensing fiber. Each of the at least two cores of the multicore lead-in fiber have a second core diameter. The second core diameter is substantially larger than the first core diameter. The system further includes an alignment means for aligning the multicore sensing fiber and the multicore lead-in fiber so that the lead-in fiber and the multicore sensing fiber are configured for coupling radiation between the fibers through the cores.

20 Claims, 3 Drawing Sheets

(56) References Cited

U.S. PATENT DOCUMENTS

| | | |
|---|---|---|
| 7,768,700 B1 | 8/2010 | Savage-Leuchs |
| 10,511,381 B2 | 12/2019 | Oda et al. |
| 10,673,199 B2 | 6/2020 | Kliner |
| 11,733,463 B2 * | 8/2023 | Voigtlander ......... G02B 6/3604 |
| | | 250/227.14 |
| 2005/0078353 A1 | 4/2005 | Komine |
| 2013/0136404 A1 | 5/2013 | Feuer |
| 2014/0119694 A1 | 5/2014 | Abedin et al. |
| 2018/0351639 A1 | 12/2018 | Oda et al. |

OTHER PUBLICATIONS

Search Report from corresponding EP Application No. EP18181742, Dec. 19, 2018.
Office Action from corresponding European Application No. 19732401.5, Oct. 14, 2022.

\* cited by examiner

MULTICORE FIBER CONNECTIVITY USING DIFFERENT MODE FIELD DIAMETERS

FIELD OF THE INVENTION

The present invention relates to the field of optics. More particularly, the present invention relates to systems and methods using multi-core fibers, more particularly to systems and methods having good optical characteristics with reduced aligning problems.

BACKGROUND OF THE INVENTION

Multicore fibers are widely used. An example of a cross-section of a multicore fiber is shown in FIG. 1, wherein the multicore fiber 1 is shown with a number of cores 2 and with cladding material 3. The specifications of the multicore fiber are determined by the particular application for which the multicore fiber will be used.

When using multicore fibers in particular sensing applications, it is advantageous to make use of highly doped cores to improve the bend insensitivity (high Numerical Aperture), and/or the photosensitivity of the fiber. However, in order to keep the fiber single mode, reduced core diameters are needed in this case compared to standard single mode fibers. Nevertheless, aligning multicore fibers with small core diameters results in alignment problems, such that fiber-optic systems using such multicore fibers still can be improved.

SUMMARY OF THE INVENTION

It is an object of embodiments of the present invention to provide good fiber-optic based methods and systems for optical sensing. It is an advantage of embodiments of the present invention that fiber-optic based methods and systems are obtained allowing use of small diameter cores in a multicore sensing fiber, while still relaxing tolerances for manufacturing, aligning and installing the fiber-optic system.

The object is obtained by a system and/or method according to the present invention.

The present invention relates to a fiber-optic system for use in optical sensing, the fiber-optic system comprising
   a multicore sensing fiber comprising at least two cores of which each of said at least two cores has a first mode field diameter, and
   a multicore lead-in fiber comprising at least two cores having a position corresponding with the position of the at least two cores of the multicore sensing fiber, each of said at least two cores of the multicore lead-in fiber having a second mode field diameter, the second mode field diameter being substantially larger than the first mode field diameter. The system also comprises an alignment means for aligning said multicore sensing fiber and said multicore lead-in fiber so that the lead-in fiber and the multicore sensing fiber being configured for coupling radiation between the fibers through the cores.

It is to be noted that embodiments of the present invention also are envisaged for telecom applications, and not solely for sensing applications.

It is an advantage of embodiments of the present invention that for the multicore sensing fiber cores with small diameter can be used, while still relaxing the optical coupling tolerances implied in the system. By allowing small diameters for the cores of a multicore sensing fiber, a higher Numerical Aperture (NA) can be used while keeping the fiber single mode and on the same time allowing such multicore sensing fiber to be made for example bend insensitive and/or photosensitive.

It is an advantage of embodiments of the present invention that core to core coupling tolerances, i.e. tolerances induced by the fact that coupling is to be performed between cores of different multicore fibers for which the cores are not aligned center to center, can be relaxed. Such alignment errors can be induced during alignment of the different multicore fibers but also during manufacturing of the different multicore fibers.

It is also an advantage of embodiments of the present invention that the angle alignment tolerance for aligning different multicore fibers with respect to their rotation angle with respect to each other is relaxed.

It is also an advantage of embodiments of the present invention that tolerances on the connector assembly used for connecting the multicore sensing fiber and the multicore lead-in fiber can be relaxed, as for small misalignments the system automatically compensates.

It is an advantage of embodiments of the present invention that the use of fibers with different mode field diameters results in a relaxation of the production tolerances of the fiber and/or the preform.

The second mode field diameter may be at least 10% larger than the first mode field diameter, e.g. at least 25% larger than the first mode field diameter, e.g. at least 50% larger than the first mode field diameter.

In one embodiment, the cores of the multicore sensing fiber have a diameter of 5 μm, whereas the cores of the multicore lead-in fiber have a diameter of 9 μm.

It is to be noted that aside from the cores described above, the multicore sensing fiber also may comprise one or more cores that do not have a smaller mode field diameter than corresponding cores in the multicore lead-in fiber.

In one embodiment, the fibers comprise at least three cores being positioned out of the center of the fiber—also being referred to as outer cores—whereby these cores are not being positioned in a symmetric configuration, i.e. they are positioned according to a non-symmetric configuration.

The at least two cores of the multicore sensing fiber may be optical single mode cores.

The cores may be optical single mode cores for those wavelengths for which the optical system is designed. The optical system may be optimized for any wavelength window chosen. One particular example may be the range 1460 nm to 1620 nm.

The at least two cores of the multicore sensing fiber may have a higher numerical aperture, e.g. at least 1.1 times higher (or at least 10% higher), than the cores of the multicore lead-in fiber. In some embodiments, the at least two cores of the multicore sensing fiber and the at least two cores of the multicore lead-in fiber are made of materials with dopants to increase the numerical aperture, the dopant concentration for the cores of the multicore sensing fiber being at least 1.1 times higher as the concentration of the same dopant material for the cores of the multicore lead-in fiber. In some embodiments, the dopant concentration for the cores of the multicore sensing fiber may for example be at least 1.5 times higher or for example be at least 2 times higher as the concentration of the same dopant material for the cores of the multicore lead-in fiber. The doping level of the multicore lead-in fiber may for example be between 3 mol % and 6 mol %, while the doping level of the multicore sensing fiber may for example be between 10 mol % and 25 mol % in case germanium dioxide ($GeO_2$) is used as dopant.

The optical single mode cores may be highly Ge doped, e.g for making them fiber bend insensitive and/or for making them photo sensitive. Whereas a standard single mode fiber for the 1550nm range typically has a doping of 4 mol % of germanium dioxide (GeO2), the multi-core sensing fiber has a Ge doping of typically between 10 mol % and 25 mol % germanium dioxide (GeO2). In one example, the GeO2 doping may be for example 18 mol %.

The at least two cores of the multicore lead-in fiber may be optical single-mode or multi-mode cores. The cores may be optical single-mode or multi-mode cores for those wavelengths for which the optical system is designed.

The at least two cores of the multicore lead-in fiber may be lowly doped. The doping level may for example be between 2 mol % and 6 mol %. In some embodiments the cores may be Ge doped, using GeO2. The GeO2 doping in the cores of the multicore lead-in fiber may be in the range between 2 mol % and 6 mol %, e.g. 4 mol %.

The multicore lead-in fiber and the multicore sensing fiber may be configured such that at the coupling interface between the fibers, the cross-section of each of said at least two cores of the multicore sensing fiber lies within the cross-section of a corresponding core of the multicore lead-in fiber. It is an advantage of embodiments of the present invention that coupling of the radiation from the multicore sensing fiber towards the multicore lead-in fiber (or vice-versa) can be performed with low variation in loss as function of the alignment errors and manufacturing errors. The difference in mode field diameter between the multicore sensing fiber and the multicore lead-in fiber will induce a coupling loss but the variation in coupling loss between the different cores can be better controlled for given alignment errors and hence results in a more uniform loss for the different cores. Without applying such features, there is a possibility that there is no alignment position to find such that the cores of the multicore sensing fiber are at the same time aligned to the cores in the lead-in fiber. With a larger mode field diameter in the lead-in fiber, this possibility is reduced.

The fiber-optic system furthermore may comprise a connector assembly for coupling the multicore lead-in fiber to the multicore sensing fiber.

The multicore lead-in fiber may be configured for coupling the multicore sensing fiber to a read-out system.

The multicore lead-in fiber may comprise a fan-out portion for splitting the different cores from the multicore lead-in fiber into multiple fibers. According to some embodiments, the multicore lead-in fiber may be part of the interrogation system for transmitting the responses from the sensors in the multicore sensing fiber.

At least the multicore sensing fiber may be a fiber wherein at least two cores comprise a fiber Bragg grating. Such fiber can for example be produced using a Draw Tower Grating (DTG) process.

The alignment means may be part of the connector assembly.

The alignment means may comprise a translation means or a rotation means for providing a relative translation respectively rotation between the lead-in fiber and the multicore sensing fiber.

The alignment means may comprise a controller for controlling electronic, mechanical or electromagnetic alignment between the lead-in-fiber and the multicore sensing fiber.

The alignment means may be part of a closed loop control system for aligning the lead-in fiber and the multicore sensing fiber, the closed loop control system being configured for receiving information regarding an optical response at least from one or more outer cores of the multicore sensing fiber in reply to an optical input signal. Information also may be obtained from a center core, when present.

The present invention also relates to an optical sensing system for optically sensing, the optical sensing system comprising a fiber-optic system as described above, an optical radiation source for inducing radiation in the cores of the multicore sensing fiber, via the multicore lead-in fiber, and a read-out system for reading-out signals sensed with the multicore sensing fiber and received via the multicore lead-in fiber.

The present invention furthermore relates to a method for installing a fiber-optic system for use in optical sensing, the method comprising obtaining a multicore sensing fiber comprising at least two cores of which each core has a first mode field diameter, obtaining a multicore lead-in fiber comprising at least two cores having a position corresponding with the position of the at least two cores of the multicore sensing fiber, each of said at least two cores of the multicore lead-in fiber having a second mode field diameter, the second mode field diameter being substantially larger than the first mode field diameter, and aligning the multicore sensing fiber and the multicore lead-in fiber with respect to each other.

Said aligning may comprise connecting the multicore sensing fiber and the multicore lead-in fiber such that at the coupling interface between the fibers, the cross-section of each of said at least two cores of the multicore sensing fiber lies within the cross-section of a corresponding core of the multicore lead-in fiber. The latter can for example be obtained by aligning through shifting and/or rotating the fibers with respect to each other.

Said aligning may comprise translating and/or rotating at least one of the lead-in fiber or the multicore sensing fiber for aligning said fibers with respect to each other.

Said translating and/or rotation may comprise electronic, mechanical, magnetic or electromagnetic induced translating and/or rotating between the lead-in-fiber and the multicore sensing fiber.

Said aligning may be closed loop automated aligning.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
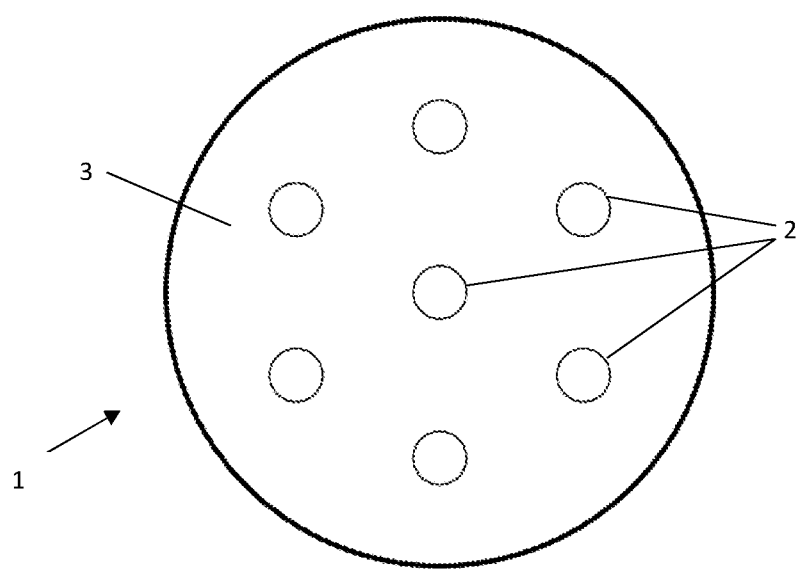
FIG. 1 illustrates a cross-section of a multicore optical fiber as known from prior art.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to an axial or longitudinal direction, reference is made to the length direction of the fiber. Where in embodiments of the present invention reference is made to a transversal direction, reference is made to directions perpendicular to the longitudinal direction.

Where in embodiments of the present invention reference is made to a multicore fiber, reference is made to a fiber comprising more than one core, e.g. 2 cores, e.g. 3 cores or even more cores, the cores being embedded in the same cladding material.

Where in embodiments of the present invention reference is made to a first diameter of the sensing cores being smaller than a second diameter of the lead-in cores, equally reference may be made to a first cross-section of the sensing cores (in a direction perpendicular to the longitudinal direction of the fiber) being smaller than a second cross-section of the lead-in cores. It is to be noted that with diameter, an average dimension may be referred to since the cross-sections of the cores in the fibers do not need to be circular.

It will be clear to the skilled person that whereas in embodiments of the present invention reference is made to mode field diameters (MFD), reference is made to the diameter of the cross-section of the region in the fiber wherein the mode is supported. In fiber optics, the mode field diameter (MFD) thus is a measure of the transverse extent of the optical intensity distribution of the fundamental mode in an optical fiber (a measure of the optical intensity distribution over the cross section of a fiber). The mode field diameter is defined as twice the mode field radius, and the mode field radius may be defined as the radius where the intensity of the fundamental mode of the light has dropped to $1/e^2$ of its peak intensity. The MFD is typically slightly larger than the core diameter of an optical fiber.

In a first aspect, the present invention relates to a fiber-optic system for use in optical sensing. The fiber-optic system according to embodiments of the present invention comprises a multicore sensing fiber comprising at least two cores of which each of said at least two cores has a first mode field diameter. The fiber-optic system also comprises a multicore lead-in fiber comprising at least two cores having a position corresponding with the position of the at least two cores of the multicore sensing fiber, each of said at least two cores of the multicore lead-in fiber having a second mode field diameter, the second mode field diameter being substantially larger than the first mode field diameter. The lead-in fiber and the multicore sensing fiber are being configured for coupling radiation between the fibers through the cores.

By way of illustration, embodiments of the present invention not being limited thereto, an exemplary fiber-optic system is described with reference to FIG. 2, whereby standard and optional features are shown.

Figure 2:
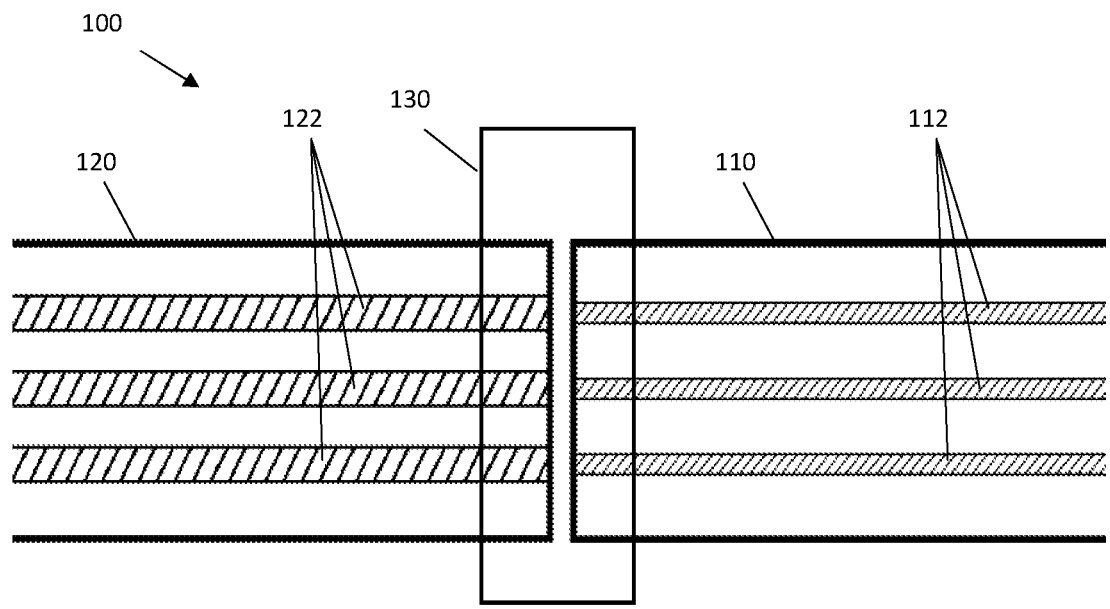
FIGS. 2 and 3 illustrates a schematic representation of a fiber-optic system according to an embodiment of the present invention.
Figure 3:
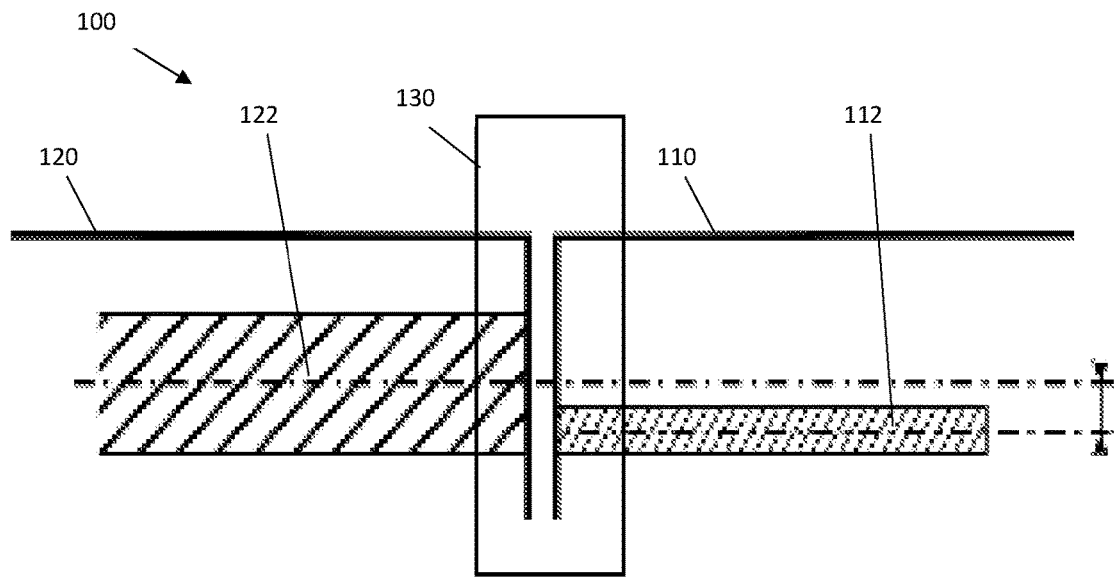

FIG. 2 and FIG. 3 illustrate schematically a fiber-optic system 100 comprising a multicore sensing fiber 110 and a multicore lead-in fiber 120 as well as the alignment means 130. Advantageously, the multicore sensing fiber 110 can make use of cores with small core diameters, allowing particular characteristics of the multicore sensing fiber 110. Some characteristics may be an insensitivity to bending, a good photosensitivity, etc. The multicore sensing fiber 110 may for example be a specially configured optical fiber with multiple single-mode cores 112 sharing the same cladding. The use of single-mode cores 112 is advantageous for obtaining accurate optical sensing. Such optical sensing may be based for example on one or more Fiber Bragg Gratings but is not limited thereto. The different cores 112 may have the same Fiber Bragg Grating(s) or different Fiber Bragg Gratings may be written for different cores 112. Alternatively, OFDR sensing and Brillouin based sensing also can be used, without the need for a grating, but still benefitting from embodiments of the present invention. The cladding diameter may be any suitable diameter, such as for example but not limited to between 60 μm and 500 μm, e.g. 125 μm. As indicated above, the average core diameter advantageously is small, e.g. between 3 μm and 7 μm, e.g. between 4 μm and 6 μm. In some embodiments, the numerical aperture of the cores of the multicore sensing fiber may be substantially higher than the numerical aperture of the cores of the multicore lead-in fiber. The numerical aperture of the cores of the multicore sensing fiber may for example be 10%, e.g. at least 25%, e.g. at least 50% higher than the numerical aperture of the cores of the multicore lead-in fiber. In one example, the numerical aperture of the cores of the multicore lead-in fiber may be 0.14, whereas the numerical aperture of the cores of the multicore sensing fiber may be at least 0.16, e.g. at least 0.20 or e.g. at least 0.25, e.g. 0.26. In some embodiments, the cores may be highly doped with dopants used for increasing the numerical aperture. The cores may for example be made of material highly doped with $GeO_2$. In one arrangement, a single central core is surrounded by more outer cores 112. In some particular embodiments, one central core is applied and 3, 4, 5, 6 or 7 outer cores 112 are provided. The outer cores 112 may be symmetrically spaced. The outer cores 112 may be positioned at a fixed position of the central core 112, although embodiments of the present invention are not limited thereto. The distance between the center and the outer cores 112 may be any suitable distance, e.g. may be about 35 μm. Also arrangements with multiple cores but without a central core are envisaged. The multicore fiber 110 may have inscribed gratings using a Draw-Tower Grating process, although embodiments are not limited thereto. In some embodiments, the multicore fiber may be a twisted multicore fiber.

As indicated above, also a multicore lead-in fiber 120 is present. According to embodiments of the present invention, since aligning of two multicore fibers having small core diameters induces significant coupling problems, embodiments of the present invention solves such alignment difficulties by using a multicore sensing fiber 110 with small core diameters but a multicore lead-in fiber 120 with larger core diameters 122 for coupling radiation to and from the multicore sensing fiber through the cores. The latter results in the fact that the alignment of the multicore fibers with respect to each other is more easy. This not only relaxes the alignment requirements as such, but also the manufacturing tolerances of the multicore fibers and/or the tolerances on connector assemblies used for coupling the multicore fibers. By way of illustration, FIG. 3 shows a core—core misalignment that can be tolerated using embodiments of the present invention. The multicore lead-in fiber 120 typically has corresponding cores, corresponding with those of the multicore sensing fiber, but having a mode field diameter that is substantially larger than those of the multicore sensing fiber. The mode field diameter of the cores in the multicore lead-in fiber may for example be at least 10%, e.g. at least 25%, e.g. at least 50% larger than the mode field diameter of the cores in the multicore sensing fiber. It is to be noted that the multicore sensing fiber also may have additional cores with a larger mode field diameter, such that the mode field diameter conditions set forth in embodiments of the present invention are not fulfilled for these additional cores.

The cores 122 of the multicore lead-in fiber may be single-mode or multi-mode cores for the envisaged wavelengths, wherein for the later multiple optical modes of the radiation of the envisaged wavelength to be used can be guided. The cores of the multicore lead-in fiber may be lowly doped, e.g. lowly doped with $GeO_2$.

In embodiments of the present invention, the different cores of the multicore sensing fiber 110 may be individually addressed. The latter may for example be performed via a customized fiber optic fan-out element which is coupled to or part of the multicore lead-in fiber. Further parameters and characteristics of the multicore lead-in fiber may correspond with characteristics of the multicore sensing fiber.

The fiber-optic system according to embodiments of the present invention, typically may have a multicore lead-in fiber 120 and the multicore sensing fiber 110 are configured such that at the coupling interface between the fibers, the cross-section of each of said at least two cores of the multicore sensing fiber 110 lies within the cross-section of a corresponding core of the multicore lead-in fiber. In other words the core of the multicore lead-in fiber 120 fully overlaps the core of the sensing fiber 110.

Figure 4:
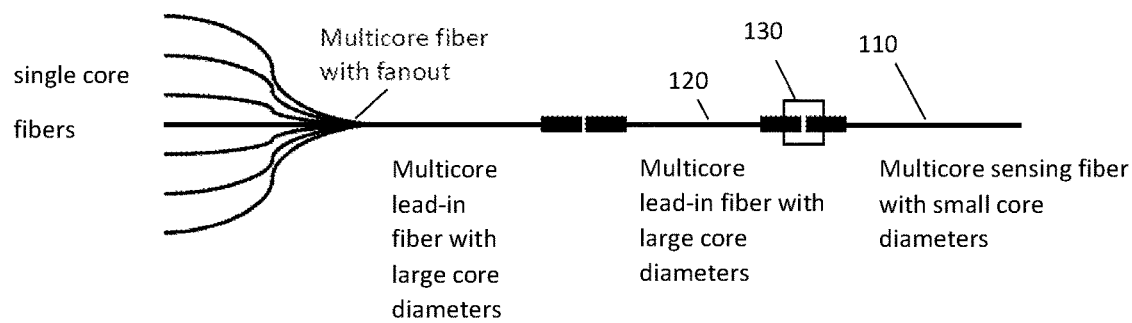
FIG. 4 illustrates a further schematic representation of a fiber-optic system according to an embodiment of the present invention.

The fiber-optic system 100 also can comprise a connector assembly for coupling the multicore lead-in fiber to the multicore sensing fiber. It further may be configured for coupling the multicore sensing fiber to a read-out system via the multicore lead-in fiber. The multicore lead-in fiber also may comprise or may be connectable to a fan-out portion for splitting the different cores from the multicore lead-in fiber into multiple fibers. Such features are shown in FIG. 4. According to embodiments of the present invention, the fiber-optic sensing system also comprises an alignment means 130 for aligning the multicore sensing fiber and said multicore lead-in fiber so that the lead-in fiber 120 and the multicore sensing fiber 110 are configured for coupling radiation between the fibers through the cores. The alignment system may be a system providing relative translational and/or rotational movement between the multicore sensing fiber and the multicore lead-in fiber, allowing to align them. The translational and/or rotational movement may be a translational and/or rotational movement providing a shift or rotation in a plane substantially perpendicular to the longitudinal axis of the fibers, so as to allow the alignment of the cores.

In some embodiments, the alignment means 130 may be an automated alignment means 130 allowing electronic, magnetic, electromagnetic or mechanical induced relative movement for aligning the fibers. The alignment means 130 may comprise a controller for controlling the alignment. Control can be performed remotely. The alignment means may be part of a closed loop control system for aligning the fibers. The closed loop system may be configured for receiving information regarding an optical response at least from one or more outer cores of the multicore sensing fiber in reply to an optical input signal. A response from the central core, if present, also may be monitored.

The alignment means may be part of the connector assembly.

In one embodiment, the alignment system could make use of an optic rotary joint with a locking means for locking the rotary joint when in the correct position. The alignment system 130 in some examples also may be or comprise a slip ring. The alignment means may comprise an adapter whereby the connectors and/or ferrules can be rotated relative to each other, either manually or automated and can be locked when in position. The connectors and/or ferrules thereby may be organized such that the fibers can be aligned with respect to each other. In some embodiments the connectors and/or ferrules may be positioned opposite each other in air. In other embodiments an optical intermedium may be provided, such as for example an index matching medium, e.g. index matching liquid.

Figure 5:
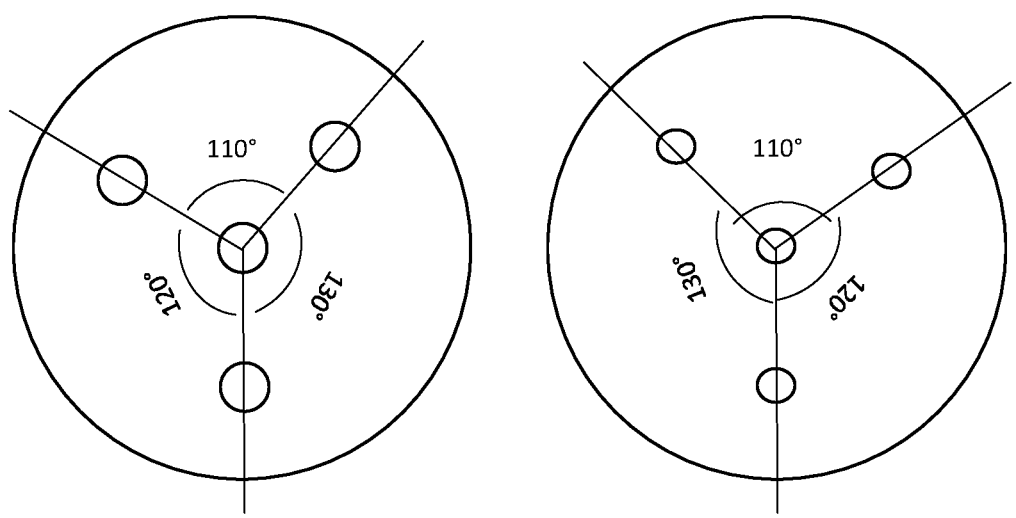
FIG. 5 illustrates a schematic representation of a fiber-optic system with asymmetric outer core configuration, according to an embodiment of the present invention.

In one embodiment, the fibers comprise at least three cores being positioned out of the center of the fiber—also being referred to as outer cores—whereby these cores are not being positioned in a symmetric configuration, i.e. they are positioned according to a non-symmetric configuration. In one example, each fiber has three cores that are not positioned in the center and the angle between them (measured from the central position) is for example 120° between the first and the second core and 110° between the first and the third core. In this way, the first, second and third core can be accurately identified. The latter has the advantage that the different cores of the multicore sensing fiber can in a unique way be addressed and measured, since there is only one rotational match which gives access to all 3 outer cores simultaneously. By way of illustration, embodiments of the present invention not being limited thereto, an exemplary cross-section for the lead-in fiber and the multicore fiber are shown in FIG. 5, whereby in the present example the cross-section of the lead-in fiber is shown at the left hand side and the cross section of the multicore sensing fiber is shown at the right hand side. It will be understood by the person skilled in the art that a non-symmetric configuration of the outer cores also can be chosen for fibers with more outer cores, allowing to uniquely identify the cores or to guarantee that there is only one rotational match which gives access to all outer cores simultaneously, or formulated differently which aligns all outer cores properly.

In one aspect, the present invention also relates to an optical sensing system for optically sensing. The optical sensing system thereby comprises a fiber-optic system as described in the first aspect, an optical radiation source for inducing radiation in the cores of the multicore sensing fiber via the multicore lead-in fiber, and a read-out system for reading-out signals sensed with the multicore sensing fiber, via the multicore lead-in fiber.

In yet another aspect, the present invention relates to a method for installing a fiber-optic system for use in optical sensing. The method comprises obtaining a multicore sensing fiber comprising at least two cores of which each core has a first mode field diameter. The method also comprises obtaining a multicore lead-in fiber comprising at least two cores having a position corresponding with the position of the at least two cores of the multicore sensing fiber, each of said at least two cores of the multicore lead-in fiber having a second mode field diameter, the second mode field diameter being substantially larger than the first mode field diameter. The method also comprises aligning the multicore sensing fiber and the multicore lead-in fiber with respect to each other. The method also may comprise connecting the multicore sensing fiber and the multicore lead-in fiber such that at the coupling interface between the fibers, the cross-section of each of said at least two cores of the multicore sensing fiber lies within the cross-section of a corresponding core of the multicore lead-in fiber. Further steps may correspond with the functionality of the different components of the fiber-optic system.

The invention claimed is:

1. A fiber-optic system for use in optical sensing, the fiber-optic system comprising:
   a multicore sensing fiber comprising at least two cores of which each of said at least two cores has a first mode field diameter comprising a measure of a transverse extent of an optical intensity distribution of a fundamental mode in a respective one of the at least two cores and a corresponding cladding;
   a multicore lead-in fiber comprising at least two cores having a position corresponding with the position of the at least two cores of the multicore sensing fiber, each of said at least two cores of the multicore lead-in fiber having a second mode field diameter comprising a measure of a transverse extent of an optical intensity distribution of a fundamental mode in a respective one of the at least two cores of the multicore lead-in fiber and a corresponding cladding, the second mode field diameter being substantially larger than the first mode field diameter;
   an alignment means for aligning said multicore sensing fiber and said multicore lead-in fiber so that the lead-in fiber and the multicore sensing fiber being configured for coupling radiation between the fibers through the cores.

2. The fiber-optic system according to claim 1, wherein the second mode field diameter is at least 10% larger than the first mode field diameter.

3. The fiber-optic system according to claim 1, wherein the at least two cores of the multicore sensing fiber are optical single mode cores.

4. The fiber-optic system according to claim 1, wherein the at least two cores of the multicore sensing fiber have a higher numerical aperture at least 1.1 times higher than the cores of the multicore lead-in fiber.

5. The fiber-optic system according to claim 1, wherein the at least two cores of the multicore lead-in fiber are optical multi-mode cores.

6. The fiber-optic system according to claim 1, wherein the multicore lead-in fiber and the multicore sensing fiber are configured such that at the coupling interface between the fibers, the cross-section of each of said at least two cores of the multicore sensing fiber lies within the cross-section of a corresponding core of the multicore lead-in fiber.

7. The fiber-optic system according to claim 1, wherein the fiber-optic system furthermore comprises a connector assembly for coupling the multicore lead-in fiber to the multicore sensing fiber.

8. The fiber-optic system according to claim 7, wherein the alignment means is part of the connector assembly.

9. The fiber-optic system according to claim 1, wherein the alignment means comprises a translation means and/or a rotation means for providing a relative translation respectively rotation between the lead-in fiber and the multicore sensing fiber.

10. The fiber-optic system according to claim 1, wherein the alignment means comprises a controller for controlling electronic, mechanical or electromagnetic, the alignment between the lead-in-fiber and the multicore sensing fiber.

11. The fiber-optic system according to claim 10, wherein the alignment means is part of a closed loop control system for aligning the lead-in fiber and the multicore sensing fiber, the closed loop control system being configured for receiving information regarding an optical response at least from one or more outer cores of the multicore sensing fiber in reply to an optical input signal.

12. The fiber-optic system according to claim 1, wherein the multicore lead-in fiber is configured for coupling the multicore sensing fiber to a read-out system.

13. The fiber-optic system according to claim 1, wherein the multicore lead-in fiber comprises a fan-out portion for splitting the different cores from the multicore lead-in fiber into multiple fibers.

14. The fiber-optic system according to claim 1, wherein at least two cores of the multicore sensing fiber comprise a fiber Bragg grating.

15. An optical sensing system for optically sensing, the optical sensing system comprising:
   a fiber-optic system according to claim 1;
   an optical radiation source for inducing radiation in the cores of the multicore sensing fiber by transmitting radiation through the multicore lead-in fiber; and
   a read-out system for reading-out signals sensed with the multicore sensing fiber.

16. A method for installing a fiber-optic system for use in optical sensing, the method comprising:
   obtaining a multicore sensing fiber comprising at least two cores of which each core has a first mode field diameter comprising a measure of a transverse extent of an optical intensity distribution of a fundamental mode in a respective one of the at least two cores and a corresponding cladding;
   obtaining a multicore lead-in fiber comprising at least two cores having a position corresponding with the position of the at least two cores of the multicore sensing fiber, each of said at least two cores of the multicore lead-in fiber having a second mode field diameter comprising a measure of a transverse extent of an optical intensity distribution of a fundamental mode in a respective one of the at least two cores of the multicore lead-in fiber and a corresponding cladding, the second mode field diameter being substantially larger than the first mode field diameter; and
   aligning the multicore sensing fiber and the multicore lead-in fiber with respect to each other.

17. The method according to claim 16, wherein said aligning comprises connecting the multicore sensing fiber and the multicore lead-in fiber such that at the coupling interface between the fibers, the cross-section of each of said at least two cores of the multicore sensing fiber lies within the cross-section of a corresponding core of the multicore lead-in fiber.

18. The method according to claim 16, wherein said aligning comprises translating and/or rotating at least one of the lead-in fiber or the multicore sensing fiber for aligning said fibers with respect to each other.

19. The method according to claim 18, wherein said translating and/or rotation comprises electronic, mechanical, magnetic or electromagnetic induced translating and/or rotating between the lead-in-fiber and the multicore sensing fiber.

20. The method according to claim 16, wherein said aligning is closed loop automated aligning.

* * * * *